United States Patent Office 3,169,751
Patented Feb. 16, 1965

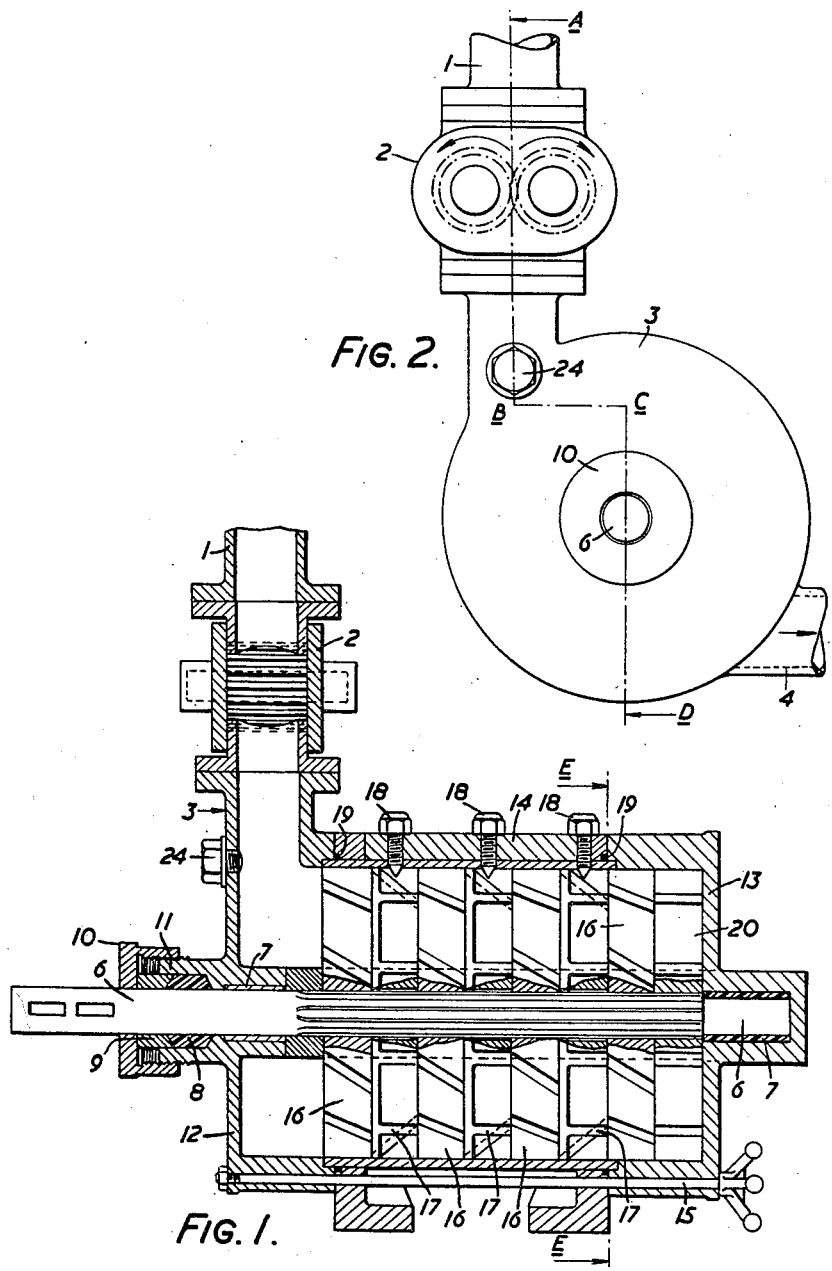

3,169,751
MIXING OR EMULSIFYING MACHINES
Thomas Steele, Wishaw, Scotland, assignor to Morton Machine Company Limited, Wishaw, Scotland, a British company
Filed July 10, 1961, Ser. No. 122,954
6 Claims. (Cl. 259—7)

This invention relates to machines for mixing or emulsifying liquid or semi-liquid materials, for example, flour and water with or without additives or mixtures of other materials.

The object of the invention is to provide an improved mixing or emulsifying machine of simple yet robust construction and capable of ensuring uniformity of mixing or emulsification of the materials or liquids.

According to the present invention, a mixing or emulsifying machine is provided with a series of co-operating members consisting of alternately arranged material propelling members and material diffusing members, the series being terminated by an impeller at the outlet end of the machine, a pump for positively feeding the material to the series of co-operating members and a further pump for effecting positive discharge of the material from the machine, the machine being further provided with means for effecting pressurization of the interior of the machine.

Figure 3:
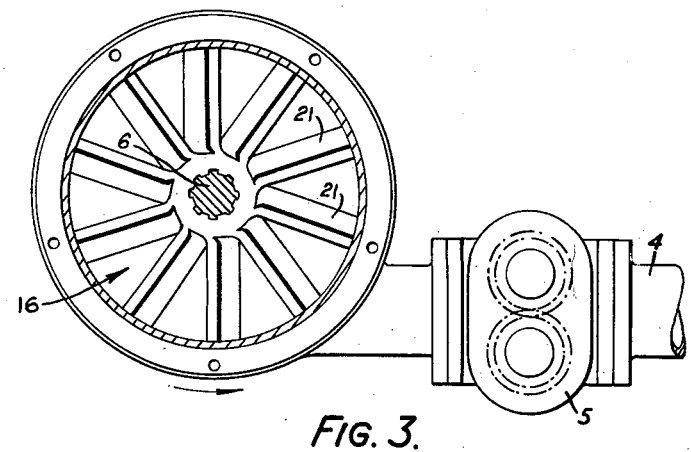
Figure 4:
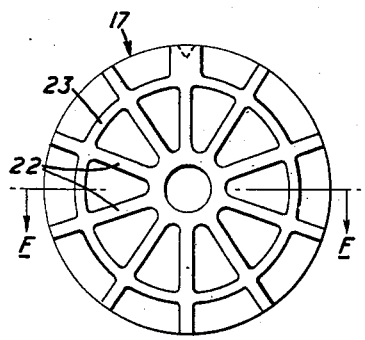
Figure 6:
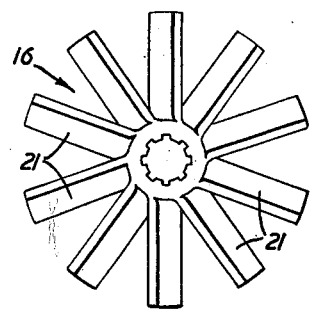
Figure 5:
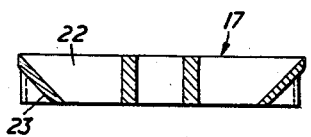
Figure 7:
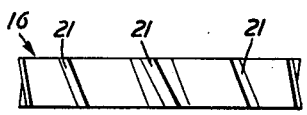

One machine constructed and arranged to operate in accordance with the invention will now be described in greater detail by way of example with reference to the accompanying drawings in which:

FIGURE 1 is an elevation in cross-section showing the principal parts of the machine, the section being taken on the line A—B—C—D of FIGURE 2, FIGURE 2 is an end elevation as seen from the left of FIGURE 1, FIGURE 3 is a view on the line E—E of FIGURE 1, FIGURE 4 is an elevation of a diffuser member, FIGURE 5 is a section on the line F—F of FIGURE 4, FIGURE 6 is an elevation of a propeller member, and FIGURE 7 is an edge elevation of the member shown in FIGURE 6.

Referring to the drawings, the material to be mixed is fed through an inlet pipe 1 to a gear pump 2 which positively drives the material to the entry end of the mixing machine indicated generally at 3. The mixed material outlet pipe 4 (FIGURES 2 and 3) includes a second gear pump 5 which ensures positive flow of the material away from the machine.

The machine has a main shaft 6 supported in bearings 7 which may be composed of either of the materials known as nylon or "Fluon" which is a registered trademark, or any other appropriate material. Packing 8 of "Fluon" is held in position by a sleeve 9 which in turn is clamped by a collared nut 10 screwed over a boss 11. The body of the machine is built up from end sections 12, 13 and a central section 14, clamping bolts 15, of which only one is shown, serving to clamp the sections rigidly together.

The shaft 6 is splined as shown to receive a plurality of propellers 16 constructed as shown in FIGURES 6 and 7 and between the propellers are disposed diffusers 17 constructed as shown in FIGURES 4 and 5. The diffusers are secured in fixed position by screws 18. O ring seals 19 are provided to prevent leakage. The diffusers 17 are made up of radial arms 22 and a joining member 23. As will be seen from FIGURE 5, the member 23 is of frusto-conical form and this has the effect that the material passing through the diffuser is directed towards the centre region of the mixer.

At the discharge end of the machine an impeller 20 is mounted for rotation with the shaft 6. A motor or other prime mover, not shown, is coupled by any convenient means to the main shaft 6 and the pumps 2 and 5 may conveniently be coupled by chain drives to the main shaft.

The machine operates rather in the manner of a turbine. Thus, while the first of the propellers 16 on rotation, effects a degree of mixing of the material, owing to the shape of the blades 21 the material is urged into the first of the diffusers 17 which breaks up the material fed to it on passage through the channels formed by the radial arms 22, and the joining member 23 directs the material towards the centre region of the mixer. Similar effects occur as the material progresses through the succeeding propellers and diffusers until the material reaches the impeller 20 which drives the material to the discharge pump 5. By the time the material has reached the discharge pump it is very thoroughly and satisfactorily mixed due to the axial, centrifugal and centripetal sequence of movement imparted to the material by each part of propellers 16 and diffusers 17.

Modifications may of course be made in the details of construction and operation of the machine as described. Thus, the number of the blades, the width and the helix angle of the propellers 16 may be varied to suit the nature of the material to be mixed. Also, the blades instead of being of constant width as shown in the accompanying drawings, may be made tapered, narrowing towards the outside diameter. The diffusers 17 may also be tapered, narrowing at the inside diameter thus allowing, if required, a greater number of mixing elements in a space of given dimensions. The clearance between the propellers and the diffusers is preferably regulated to suit the material and the degree of mixing needed.

As previously indicated, the machine described can be used as a mixer or as an emulsifier and it will normally be operated under air or other gas pressure. The pumps 2 and 5 control the rate of flow of the material into and out of the machine and are driven from a common shaft at such rates as will prevent excessive build-up of material within the mixing chamber, thus ensuring favourable conditions for aeration. Specific uses of the machine may however require that specially applied pressure should not be used. The pumps 2 and 5 may, of course, be so arranged as to effect some pressurization of the mixing machine in addition to serving their primary function of controlling the rate of flow of the material into and out of the machine.

In order to facilitate operation under air or other gas pressure when required, the body of the machine is provided with a pressure application access point represented by the sealing nut 24 although the actual point of pressure application may be selected to suit particular requirements or uses of the machine.

In known forms of mixing machines provision is sometimes made for the introduction to the mixing chamber, while under pressure, of liquids, powders or other materials and in connection with the present machine it will be understood that similar provision may be made.

I claim:

1. A mixing or emulsifying machine having an inlet and an outlet for material to be treated and comprising in combination a mixing chamber, an axially extending series of cooperating members within said chamber consisting of material propelling members and means for rotating said propelling members, with fixed material directing members alternately arranged with respect to said material propelling members, each comprising radial arms joined by a frusto-conical member which directs the material towards the centre region of the chamber, said series of co-operating members being terminated by an impeller located at the outlet of the chamber, a pump for positively feeding material to said series of co-operating members and a further pump for effecting positive discharge of the material from the machine, the machine being further provided with means for effecting pressurisation of the interior of the machine.

2. A mixing or emulsifying machine comprising in combination a housing, a material inlet pipe connected to said housing, a gear pump disposed within said inlet pipe, an outlet pipe connected to said housing, a gear pump located in said outlet pipe, said housing containing a series of co-operating members consisting of material propelling members, means for rotating said propelling members, fixed material directing members in alternation with said propelling members each comprising radial arms joined by a frusto-conical member which directs the material towards the centre region of the machine and means for effecting pressurization of the interior of the machine.

3. A machine according to claim 1 in which said material propelling members are in the form of propelling elements having a plurality of radially extending blades, the width of which is constant.

4. A machine according to claim 2 in which said material propelling members are in the form of propelling elements having a plurality of radially extending blades, the width of which is constant.

5. A machine according to claim 1 in which in operation, said material during its passage through the machine is subjected by said series of co-operating members to a repeated sequence of axial, centrifugal and centripetal movement.

6. A machine according to claim 2 in which in operation said material during its passage through the machine is subjected by said series of co-operating members to a repeated sequence of axial, centrifugal and centripetal movement.

References Cited by the Examiner

UNITED STATES PATENTS

| | | | |
|---|---|---|---|
| 2,868,143 | 1/59 | Strahmann | 259—9 X |
| 2,937,857 | 5/60 | Thurman | 259—9 |
| 2,961,223 | 11/60 | Dooley | 259—9 |

FOREIGN PATENTS 905,133  2/54  Germany.

WALTER A. SCHEEL, Primary Examiner.

LEO QUACKENBUSH, Examiner.